(12) United States Patent
Turman et al.

(10) Patent No.: US 12,715,321 B2
(45) Date of Patent: Aug. 25, 2026

(54) THREAD ADAPTER

(71) Applicant: EATON INTELLIGENT POWER LIMITED, Dublin (IE)

(72) Inventors: Jonathan Turman, Quinton, VA (US); Paul David Seff, Williamsburg, VA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 841 days.

(21) Appl. No.: 18/096,860

(22) Filed: Jan. 13, 2023

(65) Prior Publication Data

US 2024/0239213 A1 Jul. 18, 2024

(51) Int. Cl.

*B60L 53/16* (2019.01)
*B60L 53/14* (2019.01)
*B60L 53/22* (2019.01)
*B60L 53/30* (2019.01)
*B60L 53/34* (2019.01)
(Continued)

(52) U.S. Cl.

CPC ............... *B60L 53/16* (2019.02); *B60L 53/14* (2019.02); *B60L 53/22* (2019.02); *B60L 53/30* (2019.02); *B60L 53/305* (2019.02); *B60L 53/34* (2019.02); *B60L 53/66* (2019.02); *H02G 3/04* (2013.01); *H02G 3/0462* (2013.01); *H02G 3/06* (2013.01); *F16L 15/00* (2013.01); *F16L 15/06* (2013.01); *F16L 41/005* (2013.01); *F16L 47/16* (2013.01)

(58) Field of Classification Search

CPC .......... B60L 53/16; B60L 53/22; B60L 53/30; B60L 53/305; B60L 53/14; B60L 53/34; B60L 53/66; H02G 3/06; H02G 3/04; H02G 3/0462; F16L 15/00; F16L 15/006; F16L 15/007; F16L 15/06; F16L 26/02; F16L 26/021; F16L 41/005; F16L 47/16

USPC ........... 191/2, 12.4; 439/254, 302, 306, 320, 439/339, 359; 285/149.1, 390, 148.19, 285/392; 403/202, 299; 174/50.53

See application file for complete search history.

(56) References Cited

U.S. PATENT DOCUMENTS 4,537,426 A * 8/1985 Carter, Sr. ............... F16L 47/16 285/133.4
5,203,412 A * 4/1993 Doggett .............. E21B 33/1243 166/186

(Continued)

FOREIGN PATENT DOCUMENTS

CN 204349071 U * 6/2015
CN 210201024 U * 3/2020

(Continued)

*Primary Examiner* — S. Joseph Morano
*Assistant Examiner* — James William Jones
(74) *Attorney, Agent, or Firm* — Eckert Seamans Cherin & Mellott, LLC

(57) ABSTRACT

A thread adapter for connecting a data port and a cable conduit having a conduit fitting. The thread adapter includes a frame having a first end, a second end, and a thru-hole extending longitudinally from the first end to the second end. The frame further includes first female threads extending longitudinally inwardly from the first end, the first female threads structured to engage with male threads of the data port, and second female threads extending longitudinally inwardly from the second end, the second female threads structured to engage with male threads of the conduit fitting of the cable conduit.

20 Claims, 6 Drawing Sheets

(51) Int. Cl.

| | |
|---|---|
| ***B60L 53/66*** | (2019.01) |
| ***H02G 3/04*** | (2006.01) |
| ***H02G 3/06*** | (2006.01) |
| *F16L 15/00* | (2006.01) |
| *F16L 15/06* | (2006.01) |
| *F16L 41/00* | (2006.01) |
| *F16L 47/16* | (2006.01) |

(56) References Cited

U.S. PATENT DOCUMENTS

2009/0181571 A1* 7/2009 Willing .............. H01R 13/5202 439/359
2010/0061681 A1* 3/2010 Powell ................. G02B 6/3893 385/56
2014/0342593 A1* 11/2014 Murphy ................. H01R 13/53 439/452
2015/0198271 A1* 7/2015 Wright .................... F16L 15/08 285/351
2017/0264043 A1* 9/2017 Itzler ...................... H01R 13/59
2017/0346200 A1* 11/2017 Bertrand ............ H01R 13/6463
2018/0156372 A1* 6/2018 Serum ................... F16L 15/006
2020/0269713 A1* 8/2020 Hakenberg ......... H01R 13/4538
2021/0237599 A1* 8/2021 Müller-Winterberg ...................... B60L 53/67
2022/0141143 A1* 5/2022 Catarino ................. B60L 53/30 370/254
2023/0011288 A1* 1/2023 Larsen ................. H02G 3/0493

FOREIGN PATENT DOCUMENTS

CN 111952779 A * 11/2020 ........... H01R 24/005
CN 112977114 A * 6/2021 .............. B60L 53/16

* cited by examiner 1
6
4
2
301
300
310
330
400
100
210
200

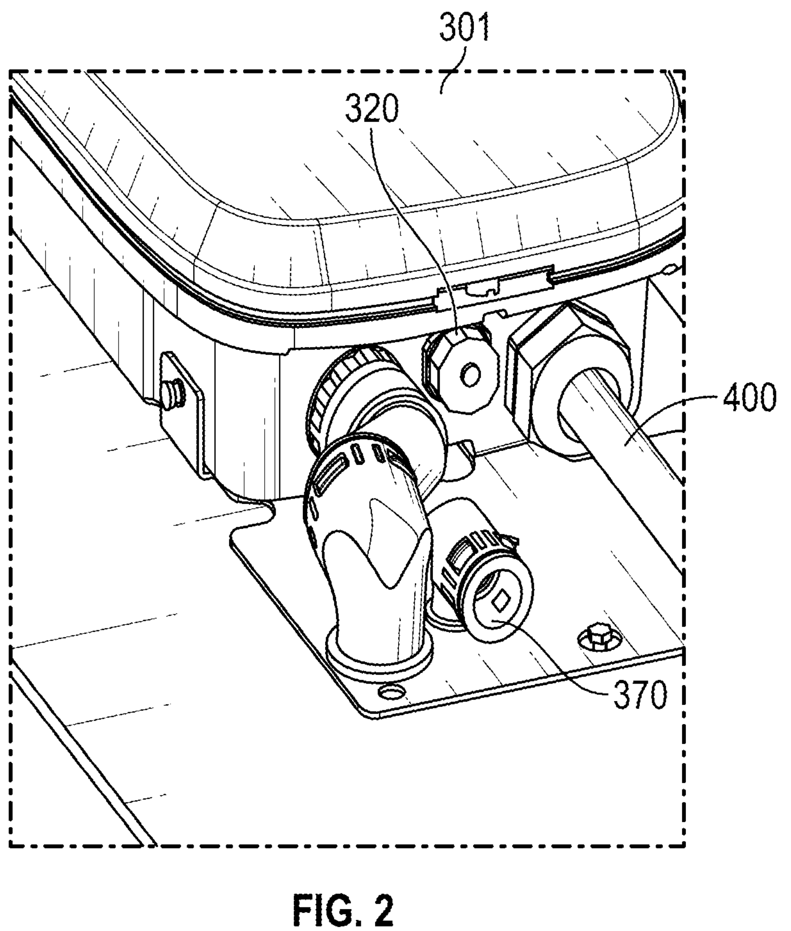
FIG. 2
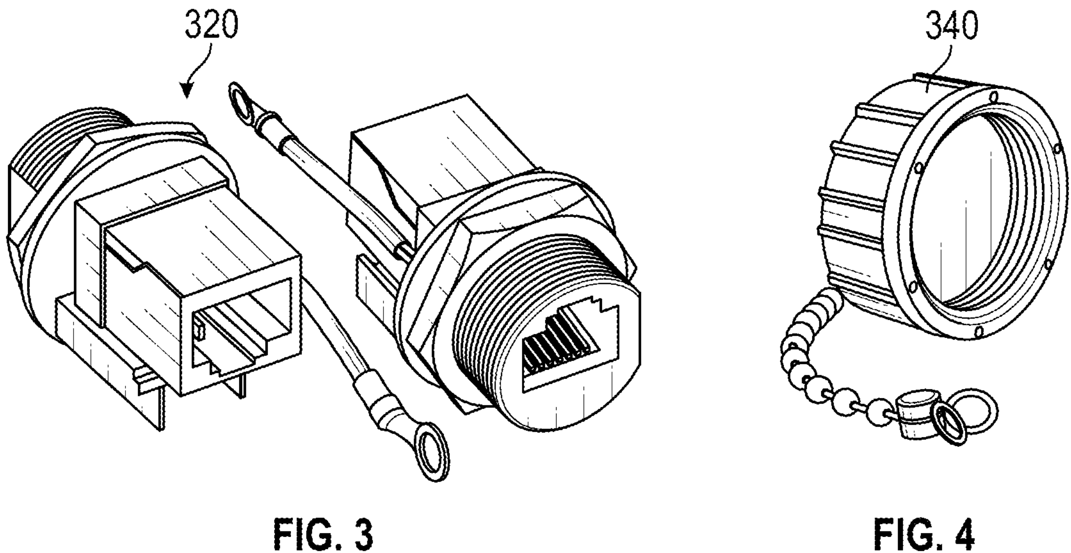
FIG. 3
FIG. 4

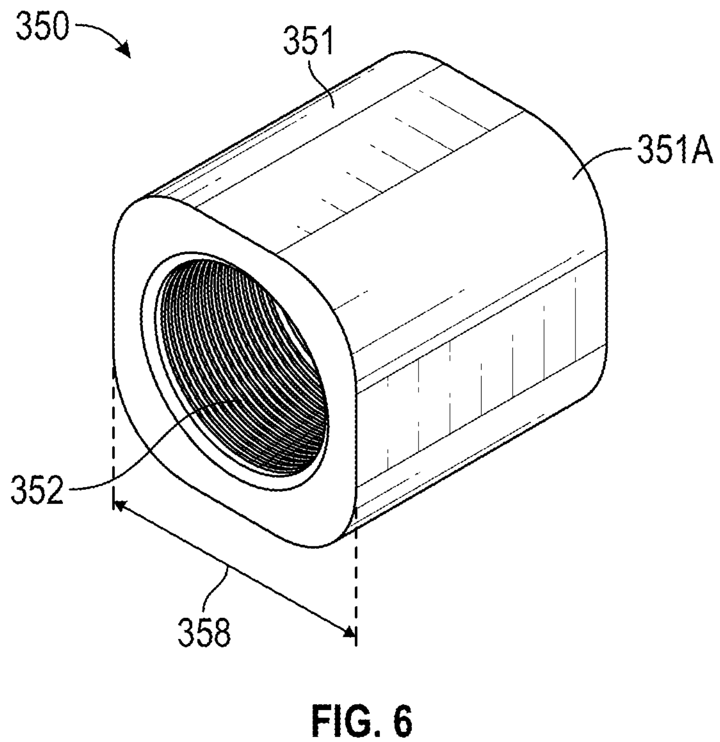
FIG. 6
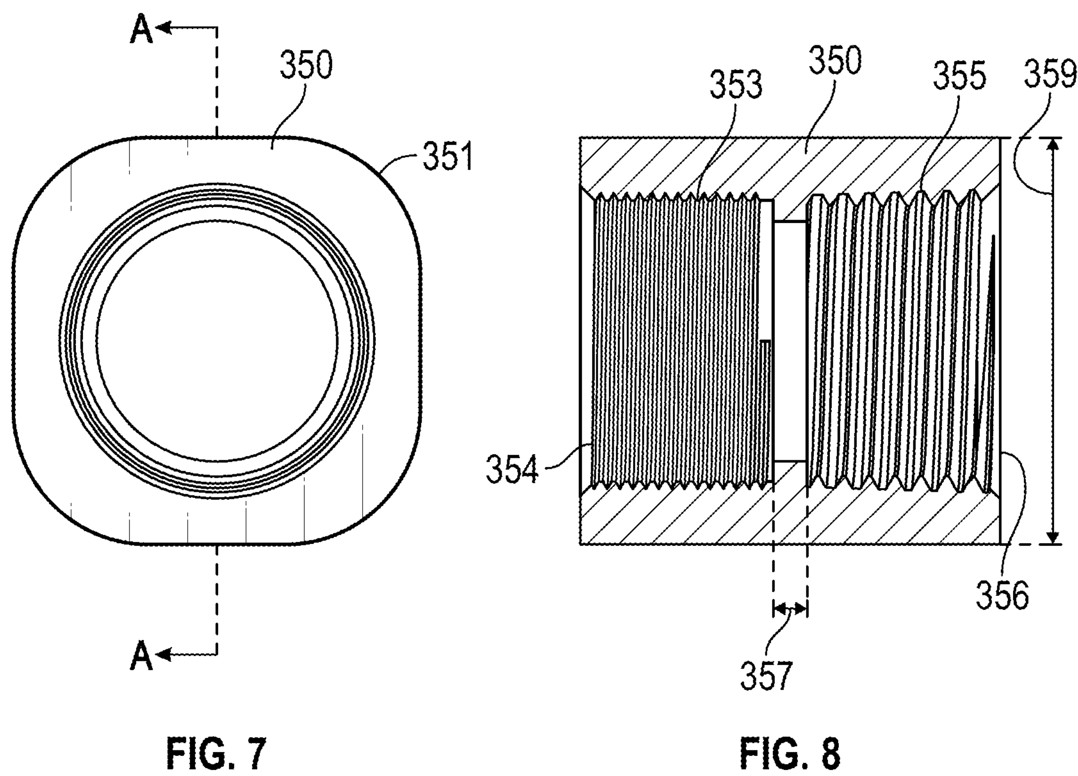
FIG. 7
FIG. 8

THREAD ADAPTER

FIELD OF THE INVENTION

The disclosed concept relates generally to a thread adapter, and in particular, to a thread adaptor for data ports in electric vehicle supply equipment (EVSE).

BACKGROUND OF THE INVENTION

With the development of electric vehicle technology, the number of EVs is growing rapidly, and electric vehicle charging stations have become popular. An EV charging station, also called an electric recharging point, charging point, or EVSE (Electric Vehicle Supply Equipment), is an element in an infrastructure that supplies electric energy for the recharging of electric energy for the recharging of EVs, plug-in hybrid electric-gasoline vehicles, or semi-static and mobile electrical units such as exhibition stands. An EV charging station is a device that safely allows electricity to flow. These charging stations and the protocols established to create them are known as EVSE, and they enhance safety by enabling two-way communication between the charging station and the electric vehicle. The EVSEs are continually being changed and improved.

SUMMARY OF THE INVENTION

A thread adapter for connecting a data port and a cable conduit having a conduit fitting is provided. The thread adapter includes a frame having a first end, a second end, and a thru-hole extending longitudinally from the first end to the second end. The frame further includes first female threads extending longitudinally inwardly from the first end, the first female threads structured to engage with male threads of the data port, and second female threads extending longitudinally inwardly from the second end, the second female threads structured to engage with male threads of the conduit fitting of the cable conduit.

Another example embodiment provides an electric vehicle charging system for charging an electric vehicle (EV). The EV charging system includes a connector and a charging cable, and an EV charger coupled to a power source and the charging cable. The EV charger includes a housing, a user input device that is disposed on a first surface of the housing and structured to receive user data, and a data port that is disposed on a second surface of the housing. The data port includes first male threads and coupled to communication lines via a conduit for routing cables. The conduit includes a conduit fitting having second male threads. The data port is coupled to the conduit via a thread adapter. The thread adapter includes: a frame having a first end, a second end, and a thru-hole extending longitudinally from the first end to the second end. The frame further includes first female threads extending longitudinally inwardly from the first end, the first female threads structured to engage with the first male threads of the data port; and second female threads extending longitudinally inwardly from the second end, the second female threads structured to engage with the second male threads of the conduit fitting. The first female threads engage with the male threads of the data port, and the second female threads engage with the NPT male threads of the conduit fitting. The user data received from the user input device are transmitted to at least one of a server or a workstation via the data port, the cables disposed within the conduit, and the communication lines.

BRIEF DESCRIPTION OF THE DRAWINGS

A full understanding of the invention can be gained from the following description of the preferred embodiments when read in conjunction with the accompanying drawings in which:

FIG. 2 is a partial view of a bottom end of an EVSE in accordance with a non-limiting embodiment of the disclosed concept;

FIG. 3 illustrates example conventional data ports for use in an EVSE in accordance with a non-limiting embodiment of the disclosed concept;

FIG. 4 is an example conventional cap for covering the data ports of FIG. 3;

FIG. 6 is a perspective view of a thread adapter in accordance with a non-limiting embodiment of the disclosed concept;

FIG. 7 is a front view of a thread adapter in accordance with a non-limiting embodiment of the disclosed concept;

FIG. 8 is a cut-out view of the thread adapter cut via the line A-A of FIG. 7 in accordance with a non-limiting embodiment of the disclosed concept;

DETAILED DESCRIPTION OF THE INVENTION

Figure 1:
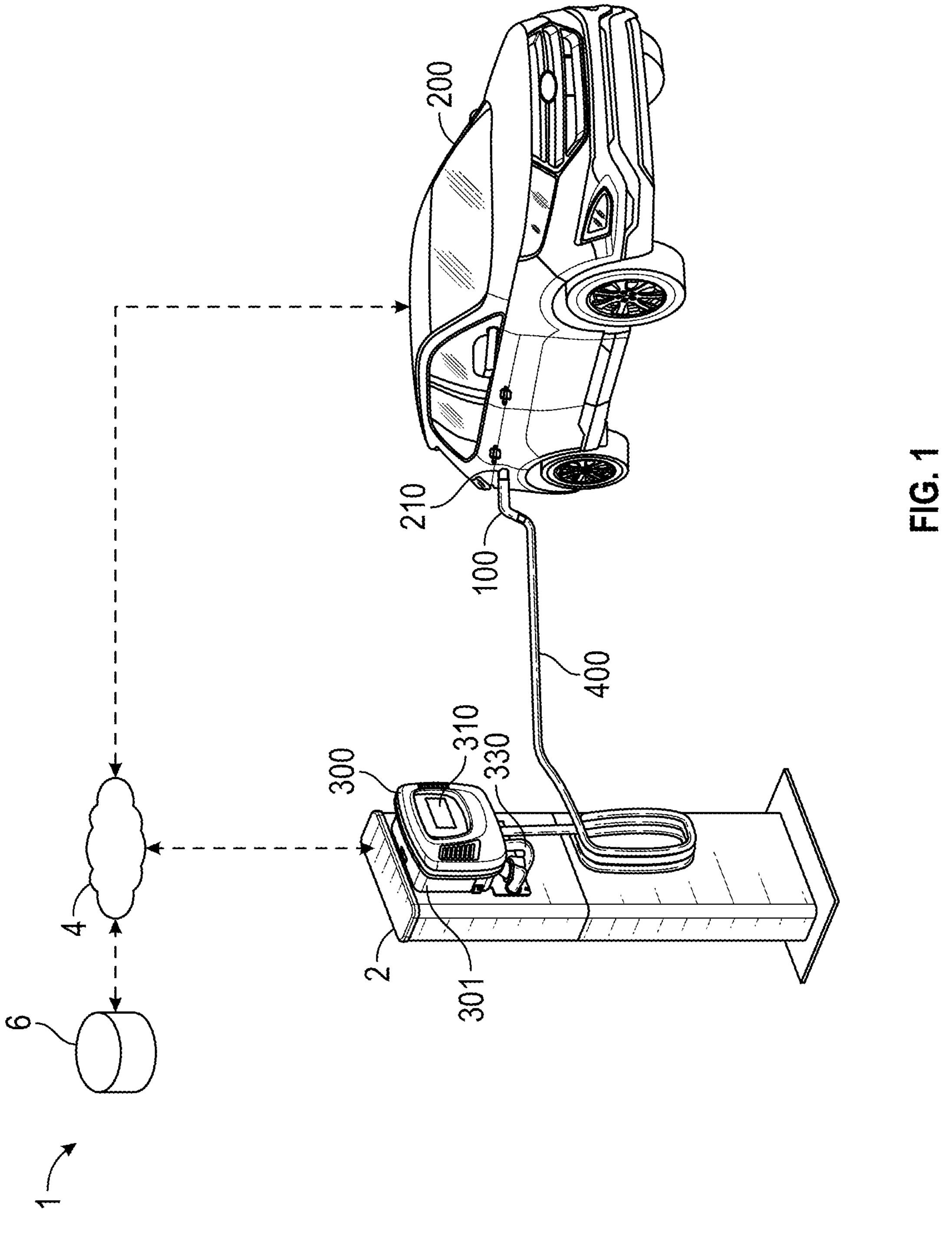
FIG. 1 is a system for EV charging in accordance with a non-limiting embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "charging box" shall mean an apparatus having any geometry (e.g., box-shaped and non-box shaped geometries), and that is structured to produce an electric charge for the purpose of charging an EV.

FIG. 1 illustrates a system for EV charging in accordance with a non-limiting embodiment of the disclosed concept. The system 1 includes a charging station 2 with an EV 200, both communicatively coupled to the network 4, which in turn is coupled to an authentication server (e.g., without limitation, authentication database) or a charging station manager workstation 6. The example charging station 2 includes an EV charger 300 and an EV connector 100 coupled to the EV charger 300 via the EV charging cable 400. The charger 300 includes, e.g., without limitation, an AC charger, a DC charger, or a combination thereof. The charging station 2 may be a pedestal or wall-mounted EV charger.

The EV connector 100 is structured to be connected to a charge port 210 of the EV 200 for charging the EV 200 via a charge cable 400. The EV charger 300 may include a housing 301 and a user input device 310 on a front surface of the housing 301. The user input device 310 may be a touch-screen display and/or a payment device reader (e.g., without limitation, a credit card reader, an NFC signal reader, a BLE signal reader, or a chip reader. For example, upon connecting the EV 200 to the charging station 2 via the connector 100, the user may swipe a credit card through the credit card reader on the user input device 310 for payment. The EV charger 300 may also include a data port 320 (e.g., without limitation, Ethernet data port) on its housing 301 as shown in FIG. 2. In FIGS. 1 and 2, the data port 320 is disposed at a bottom surface of the housing 301 of the EV charger 300, but this is for illustrative purposes only and the data port 320 may be disposed at other positions, e.g., sides of the housing 301 or within the housing.

Figure 5:
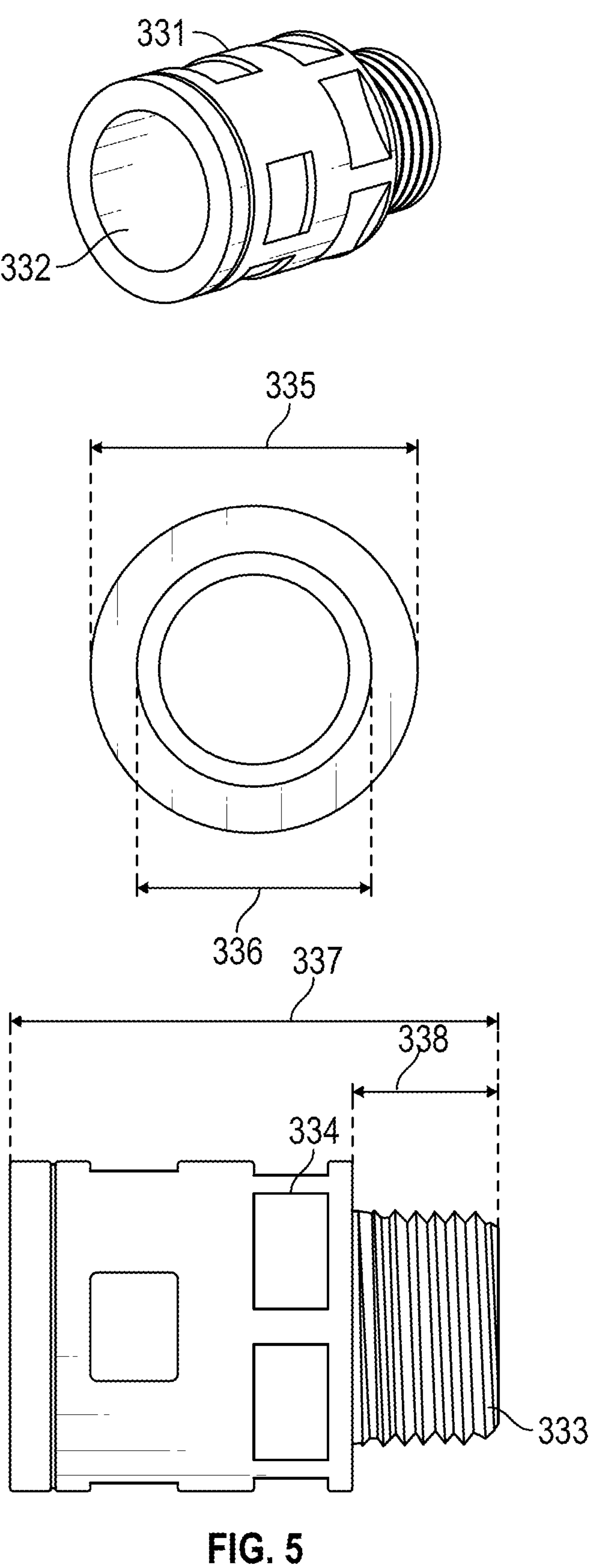
FIG. 5 is an example conventional standard national NPT conduit fitting for a standard national conduit.

The data ports 320 generally include threads having a specialty thread type, e.g., 13⁄16-28 thread type, that is very rare. FIG. 3 shows example data ports 320 The specialty threads allow for a cap 340, as shown in FIG. 4, to be placed over the data port 320 to protect against washdown when the data port 320 is not in use. When in use, the data ports 320 are connected to communication lines via USB cables. The USB cables are connected to data ports 320 at one end and a connector 370 at another end. The connector 370 is coupled to the communication lines, e.g., embedded within a wall. In order to protect the USB cables from tampering and environmental factors, the cables may be routed through a conduit 330 (e.g., standard pipe conduit). The conduit 330 is a standard national conduit and includes a fitting 331, e.g., an NPT (National Pipe Taper) conduit fitting as shown in FIG. 5. An NPT conduit fitting 331 is approximately 43.4 mm (1.71 inches) in length 337 with a thru-hole 332 and 27 mm Hex socket. The fitting 331 has an outer diameter 335 of approximately 29.46 mm (1.16 inches) and an inner diameter 336 of 21.08 mm (0.83 inches). The NPT conduit fitting 331 has NPT male threads 333 (e.g., ½ inch NPT pipe size with 14 threads/per inch) at one end. The threads 333 extends longitudinally 338 approximately 12.95 mm. A thread adapter 350 connects the data port 320 and the NPT conduit fitting 331 such that the data port 320 may be connected to the conduit 330 at all times, thereby allowing any data received during charging can be readily transmitted to the server or workstation 6 via the communication lines at any time and eliminating the need for the cap 340 to be placed on and off repeatedly.

Figure 9:
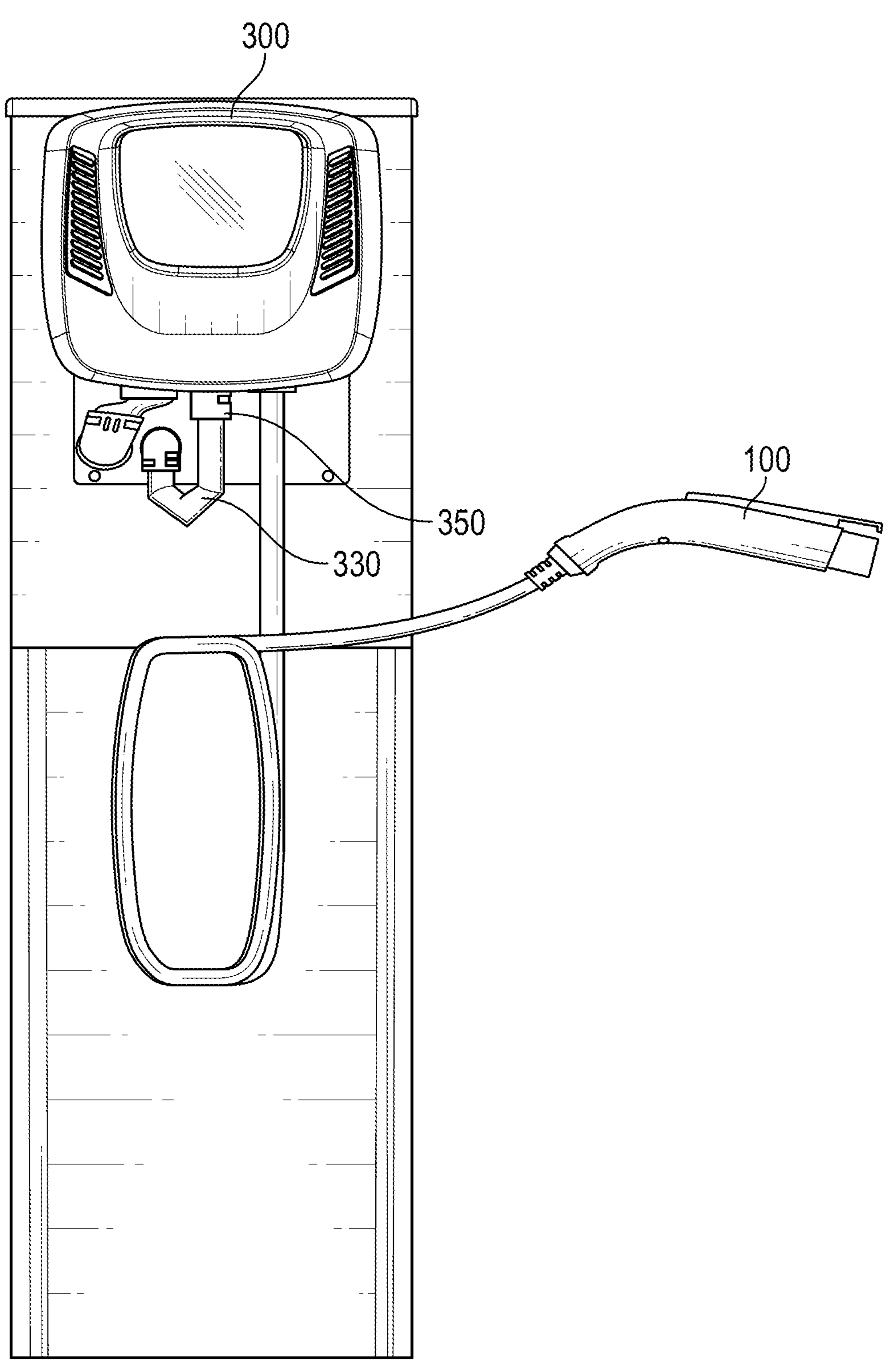
FIG. 9 is a front view of an example EVSE having an inventive customized thread adapter that connects the data ports of the EVSE and the standard national conduit fitting and routing data cables within a standard conduit to communication lines in accordance with a non-limiting embodiment of the disclosed concept.

FIGS. 6-8 illustrate an example thread adapter 350 in accordance with a non-limiting example embodiment of the disclosed concept. FIG. 7 is a perspective view of the thread adapter 350. FIG. 8 is a front view of the thread adapter 350. FIG. 9 is a cut-out view of the thread adapter 350 cut along the line A-A as shown in FIG. 8.

The thread adapter 350 is structured to connect the data port 320 and the NPT conduit fitting 331 of the standard conduit 330, which routes the USB cables therein. The standard conduit 330 is coupled to the connector 370, which in turn is coupled to the communication lines. The thread adapter 350 includes a frame 351 having a first end 354, a second end 356, and a thru-hole 352 extending longitudinally from the first end 354 to the second end 356. The frame 351 is of rectangular shape with rounded corners 351A. The rectangular shape allows for easy grip with a tool for tightening the thread adapter 350 onto the respective threads. The rounded corners 351A may have a diameter of approximately 9.53 mm (0.375 inches). Such rounded corners make the thread adapter 350 easier to be used for a tool, help reduce wear and tear of the thread adapter 350 itself and other components around it, and aesthetically pleasing. The frame 351 may be approximately 29.49 mm (1.161 inches) in length, 28.58 mm (1.125 inches) in width, and 28.58 mm (1.125 inches) in height. As such, the thread adapter 350 is compact in size such that no space is wasted for the conduit 330 or other cables near the data port 320 or the conduit 330. The frame 351 may be made of plastic, e.g., without limitation, thermoplastic material.

The frame 351 further includes first female threads 353 extending longitudinally inwardly from first end 354 and second female threads 355 extending longitudinally inwardly from the second end 356. The first female threads 353 are structured to engage with male threads of the data ports 320. The second female threads 355 are structured to engage with male threads of the NPT conduit fitting 331 of the conduit 330. The first female threads 353 are 13⁄16-28 Unified Special (UNS) female threads (i.e., ½ inch 13⁄16-28× 17⁄32 inch deep UNS right hand female threads) and mate with the rare specialty 13⁄16-28 UNS male threads of the Ethernet data port 320. The second female threads 355 are NPT female threads (i.e., ½ inch NPT×17⁄32 inch deep right hand female threads) and mate with the NPT male threads of the NPT standard pipe conduit fitting 331. The first female threads extend longitudinally inwardly approximately 13.46 mm from the first end 354. The second female threads extend longitudinally inwardly approximately 13.46 mm from the second end 356. The first female threads 353 are separated from the second female threads 355 by a distance of approximately 2.39 mm. To connect the standard conduit 330 using the thread adapter 350, the user turns clockwise the thread adapter 350 onto the specialty 13⁄16-28 male threads of the data port 320 until the thread adapter 350 is tightly connected to the data port 320. Then, the user turns clockwise the NPT standard pipe conduit fitting 331 onto the NPT female threads of the data port 320 until the NPT standard pipe conduit fitting 331 is tightly connected thereto.

Figure 10:
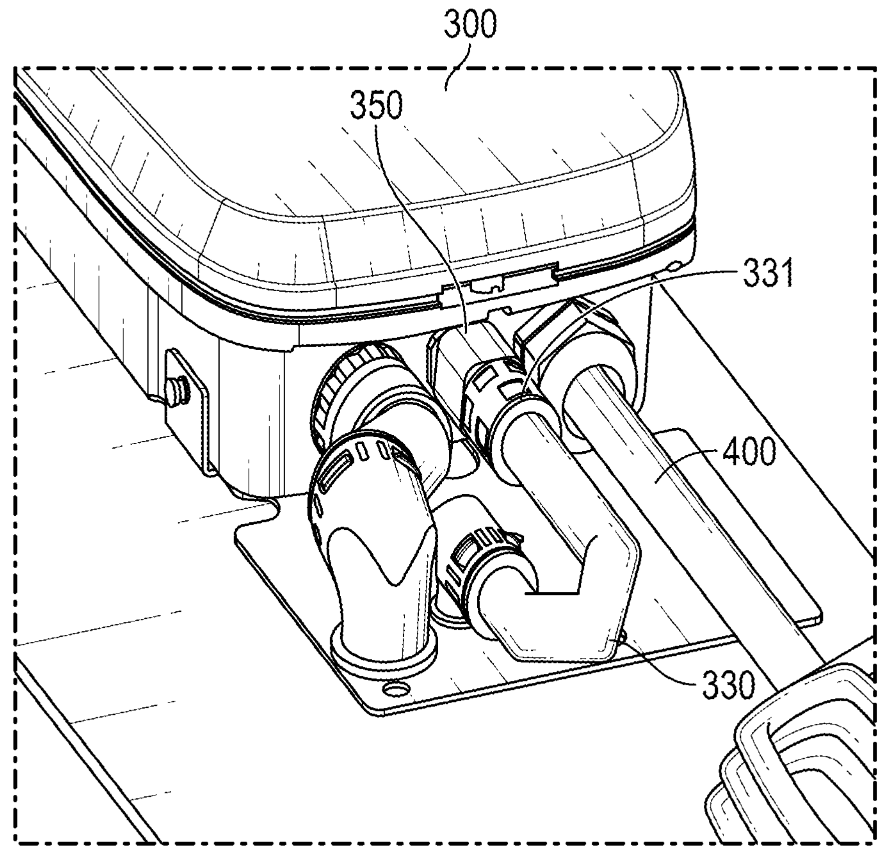
FIG. 10 is a partial perspective view of a bottom end of the EVSE having a customized thread adapter that connects the data ports of the EVSE and the standard national conduit fitting and routing data cables within a standard conduit to communication lines in accordance with a non-limiting embodiment of the disclosed concept.

FIGS. 9 and 10 illustrate an example charging station 2 fully installed using the thread adapter 350 according to a non-limiting example embodiment of the disclosed concept. The data ports 320 are in a threaded engagement with the first plurality of threads 353 of the thread adapter 350, and thus is covered by the thread adapter 350. The thread adapter 350 then makes a threaded engagement with the NPT standard pipe conduit fitting 331. The USB cables are then routed via the standard conduit 330 to the connector 370. When a user enters user information via the user input device 310, the data travel from the user input device 310 to the server or workstation 6 via the data port 320, the USB cables disposed within the standard conduit 330, and the communication lines.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A thread adapter for connecting a data port and a cable conduit having a conduit fitting, comprising:

a frame having a first end, a second end arranged opposite the first end, and a thru-hole extending longitudinally from the first end to the second end, the frame further comprising:

first female threads extending longitudinally inwardly from the first end, the first female threads structured to engage with first male threads of the data port; and second female threads extending longitudinally inwardly from the second end, the second female threads structured to engage with second male threads of the conduit fitting of the cable conduit, wherein the first female threads are a different female thread type than the second female threads and the first male threads are a different male thread type than the second male threads.

2. The thread adapter of claim 1, wherein the first female threads are 13/16-28 Unified Special (UNS) female right hand threads.

3. The thread adapter of claim 2, wherein the first female threads are structured to engage with 13/16-28 UNS male threads of the data port.

4. The thread adapter of claim 1, wherein the first female threads extend longitudinally inwardly approximately 13.46 mm from the first end.

5. The thread adapter of claim 1, wherein the second female threads extend longitudinally inwardly approximately 13.46 mm from the second end.

6. The thread adapter of claim 1, wherein the second female threads are National Pipe Taper (NPT) female right hand threads.

7. The thread adapter of claim 6, wherein the second female threads are structured to engage with NPT male threads of the conduit fitting.

8. The thread adapter of claim 1, wherein the frame is of rectangular shape.

9. The thread adapter of claim 8, wherein the frame has rounded corners.

10. The thread adapter of claim 9, wherein the rounded corners each have a diameter of approximately 9.53 mm.

11. The thread adapter of claim 8, wherein the frame has a length of approximately 29.49 mm.

12. The thread adapter of claim 8, wherein the frame has a width of approximately 28.58 mm.

13. The thread adapter of claim 8, wherein the frame has a height of approximately 28.58 mm.

14. The thread adapter of claim 1, wherein the frame is made of thermoplastic material.

15. The thread adapter of claim 1, wherein the first female threads are separated apart from the second female threads by a length of approximately 2.39 mm.

16. An electric vehicle charging system for charging an electric vehicle (EV), the electric vehicle charging system comprising:

a connector and a charging cable; and an EV charger coupled to a power source and the charging cable, the EV charger including a housing, a user input device that is disposed on a first surface of the housing and structured to receive user data, and a data port that is disposed on a second surface of the housing, the data port including first male threads and coupled to communication lines via a conduit for routing cables, the conduit including a conduit fitting having second male threads, wherein the data port is coupled to the conduit via a thread adapter that includes:

a frame having a first end, a second end, and a thru-hole extending longitudinally from the first end to the second end, the frame further comprising:

first female threads extending longitudinally inwardly from the first end, the first female threads structured to engage with the first male threads of the data port; and second female threads extending longitudinally inwardly from the second end, the second female threads structured to engage with the second male threads of the conduit fitting, wherein the first female threads engage with the first male threads of the data port, and the second female threads engage with the second male threads of the conduit fitting, wherein the first female threads are a different female thread type than the second female threads and the first male threads are a different male thread type than the second male threads; and wherein user data received from the user input device are transmitted to at least one of a server or a workstation via the data port, the cables disposed within the conduit, and the communication lines.

17. The EV charging system of claim 16, wherein the first female threads are 13/16-28 Unified Special (UNS) female right hand threads and the first male threads are 13/16-28 UNS male threads.

18. The EV charging system of claim 16, wherein the second female threads are National Pipe Taper (NPT) female right hand threads and the second male threads are NPT male threads.

19. The EV charging system of claim 16, wherein the frame is of rectangular shape.

20. The EV charging system of claim 16, wherein the frame has rounded corners.

* * * * *